US010488745B2

(12) United States Patent
Imae et al.

(10) Patent No.: US 10,488,745 B2
(45) Date of Patent: Nov. 26, 2019

(54) LIGHT SOURCE DEVICE, ILLUMINATION DEVICE, AND PROJECTOR

(71) Applicant: SEIKO EPSON CORPORATION, Tokyo (JP)

(72) Inventors: Noriko Imae, Matsumoto (JP); Takayuki Matsubara, Chino (JP); Katsumitsu Hama, Matsumoto (JP); Noriyuki Hirano, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 23 days.

(21) Appl. No.: 15/776,182

(22) PCT Filed: Nov. 16, 2016

(86) PCT No.: PCT/JP2016/083969
§ 371 (c)(1),
(2) Date: May 15, 2018

(87) PCT Pub. No.: WO2017/090496
PCT Pub. Date: Jun. 1, 2017

(65) Prior Publication Data
US 2019/0155135 A1   May 23, 2019

(30) Foreign Application Priority Data
Nov. 27, 2015   (JP) ................................. 2015-231416

(51) Int. Cl.
*G03B 21/20* (2006.01)
*F21S 2/00* (2016.01)
(Continued)

(52) U.S. Cl.
CPC .............. *G03B 21/208* (2013.01); *F21S 2/00* (2013.01); *G02B 19/0052* (2013.01);
(Continued)

(58) Field of Classification Search
CPC .... G03B 21/208; G03B 21/14; G03B 21/204; G03B 21/2066; G03B 21/00; G03B 21/20;
(Continued)

(56) References Cited

U.S. PATENT DOCUMENTS 8,628,199 B2* 1/2014 Akiyama ........... G02B 19/0057
353/94
9,429,831 B2* 8/2016 Akiyama ........... G03B 21/2073
(Continued)

FOREIGN PATENT DOCUMENTS

JP   2012-047996 A   3/2012
JP   2013-004231 A   1/2013
(Continued)

OTHER PUBLICATIONS

Feb. 14, 2017 International Search Report issued in Patent Application No. PCT/JP2016/083969.

*Primary Examiner* — Bao Q Truong
(74) *Attorney, Agent, or Firm* — Oliff PLC (57) ABSTRACT

A light source device includes: a light source section emitting excitation light; homogenizer optical element; first condensing element converging the excitation light; wavelength conversion element on which the converged excitation light is incident and that emits fluorescent light; and light separation element. The light source section, homogenizer optical element, and light separation element are disposed on a first illumination optical axis. The light separation element emits at least a portion of the excitation light incident from the homogenizer optical element toward the first condensing element, and emits the fluorescent light incident from the wavelength conversion element through the first condensing element in a direction of a second illumination optical axis intersecting the first illumination optical axis at the light separation element, the homogenizer
(Continued)

optical element includes first and second multi-lenses, and the first and second multi-lenses are movable along an orthogonal plane with respect to the first illumination optical axis.

15 Claims, 3 Drawing Sheets

(51) Int. Cl.
| | |
|---|---|
| *G03B 21/14* | (2006.01) |
| *H04N 5/74* | (2006.01) |
| *G02B 19/00* | (2006.01) |
| *G02B 27/28* | (2006.01) |
| *G03B 21/00* | (2006.01) |
| *G02B 26/00* | (2006.01) |

(52) U.S. Cl.
CPC ............ *G02B 27/283* (2013.01); *G03B 21/14* (2013.01); *G03B 21/204* (2013.01); *G03B 21/2066* (2013.01); *H04N 5/74* (2013.01); *G02B 26/008* (2013.01); *G03B 21/00* (2013.01)

(58) Field of Classification Search
CPC ... G03B 21/2013; G03B 21/2033; F21S 2/00; G02B 19/0052; G02B 27/283; G02B 26/008; H04N 5/74; F21V 13/00; F21V 13/12; F21V 14/06; F21V 5/007; F21V 5/008
See application file for complete search history.

(56) References Cited

U.S. PATENT DOCUMENTS

| | | | | |
|---|---|---|---|---|
| 9,500,941 | B2* | 11/2016 | Akiyama | ............ G03B 21/208 |
| 9,568,817 | B2* | 2/2017 | Akiyama | ............ H04N 9/3164 |
| 2012/0051044 | A1 | 3/2012 | Akiyama | |
| 2013/0107231 | A1 | 5/2013 | Ohsugi | |
| 2015/0153020 | A1 | 6/2015 | Akiyama | |
| 2016/0033853 | A1 | 2/2016 | Akiyama | |

FOREIGN PATENT DOCUMENTS

| | | | |
|---|---|---|---|
| JP | 2013-097233 | A | 5/2013 |
| JP | 2015-040871 | A | 3/2015 |
| JP | 2015-106130 | A | 6/2015 |

* cited by examiner

LIGHT SOURCE DEVICE, ILLUMINATION DEVICE, AND PROJECTOR

TECHNICAL FIELD

The present invention relates to a light source device, an illumination device, and a projector.

BACKGROUND ART

Projectors including an illumination device including a solid-state light source that emits excitation light and a wavelength conversion element that is excited by the excitation light and emits fluorescence have been conventionally known (e.g., see PTL 1).

Specifically, a projector disclosed in PTL 1 includes an illumination device including an array light source, a collimator optical system, an afocal optical system, a first retardation film, a homogenizer optical system, a prism, alight emitting element (wavelength conversion element), a second retardation film, a diffuse reflection element, an integrator optical system, a polarization conversion element, and a superimposing optical system. In these components, the array light source, the collimator optical system, the afocal optical system, the first retardation film, the homogenizer optical system, the prism, the second retardation film, and the diffuse reflection element are located on a first optical axis, while the prism, the light emitting element (wavelength conversion element), the integrator optical system, the polarization conversion element, and the superimposing optical system are located on a second optical axis orthogonal to the first optical axis. The prism is disposed at a site where the first optical axis and the second optical axis intersect.

The array light source has a configuration in which a plurality of semiconductor lasers that are solid-state light sources are arranged in an array. Blue light of S-polarization that is laser light emitted from the array light source is converted to a parallel luminous flux by the collimator optical system, and adjusted in luminous flux diameter by the afocal optical system. The polarization axis of the blue light is rotated when the blue light passes through the first retardation film, which is a half-wave plate, and a portion of the blue light, which is S-polarized light, is converted to P-polarized light.

In an S-polarization component and a P-polarization component that are contained in the blue light, the S-polarization component is reflected by a polarization separation element of the prism, while the P-polarization component transmits through the polarization separation element.

The reflected S-polarization component is incident as excitation light on a phosphor layer of the light emitting element, and thus yellow fluorescent light is generated. The fluorescent light is unpolarized light whose polarization direction is not aligned. The fluorescent light transmits through the polarization separation element while remaining in the unpolarized state, and is incident on the integrator optical system.

On the other hand, the P-polarization component of the blue light transmitted through the polarization separation element passes through the second retardation film, and is diffusely reflected by the diffuse reflection element. This blue light is incident again on the second retardation film to thereby be converted to the S-polarization component, is reflected by the polarization separation element, and incident on the integrator optical system.

The integrator optical system includes a first lens array including a plurality of first lenses, and a second lens array including a plurality of second lenses corresponding to the plurality of first lenses. The integrator optical system divides illumination light containing the blue light and the fluorescent light into a plurality of partial luminous fluxes, and superimposes, together with the superimposing optical system, the plurality of partial luminous fluxes onto light modulating devices as regions to be illuminated. Between the integrator optical system and the superimposing optical system, the polarization conversion element is disposed, and thus the polarization direction is aligned.

Then, color lights (image lights) that are modulated by the light modulating devices are combined by the combining optical system, and thereafter enlarged and projected onto a screen by the projection optical device.

CITATION LIST

Patent Literature

PTL 1: JP-A-2015-106130

SUMMARY OF INVENTION

Technical Problem

However, in the projector disclosed in PTL 1, the S-polarization component and the P-polarization component are separated by the polarization separation element from the blue light emitted from the array light source and transmitted through the first retardation film as described above, and diffused light of blue light and diffused light of fluorescent light that are generated by these lights are incident again on the polarization separation element. Then, the diffused light of the blue light and the diffused light of the fluorescent light are combined by the polarization separation element, and the illumination light containing these diffused lights is incident on the integrator optical system. Hence, when the central axis of the excitation light incident on the polarization separation element is inclined with respect to the first optical axis, an optical path difference occurs between the optical path of the diffused light of the blue light reflected by the polarization separation layer and the optical path of the diffused light of the fluorescent light transmitted through the polarization separation element. That is, the central axis of the diffused light of the blue light and the central axis of the diffused light of the fluorescent light do not coincide. In this case, an illuminance distribution incident on the first lens array is different between the blue light and the fluorescent light. Then, when the blue light and the fluorescent light are incident on the first lens array, there are problems in that illuminance unevenness is likely to occur on the light modulating device as the region to be illuminated onto which the plurality of partial luminous fluxes generated by the first lens array are superimposed, and thus that color unevenness is likely to occur in a projection image.

The invention is aimed at solving at least a portion of the problems. It is an object of the invention to provide a light source device and an illumination device both capable of suppressing the occurrence of illuminance unevenness, and further, it is another object of the invention to provide a projector capable of suppressing the occurrence of color unevenness.

Solution to Problem

A light source device according to a first aspect of the invention includes: a light source section that emits excitation light; a homogenizer optical element on which the excitation light is incident; a first condensing element that converges the excitation light through the homogenizer optical element; a wavelength conversion element on which the excitation light converged by the first condensing element is incident and that emits fluorescent light; and a light separation element, wherein the light source section, the homogenizer optical element, and the light separation element are disposed on a first illumination optical axis, the light separation element emits at least a portion of the excitation light incident from the homogenizer optical element toward the first condensing element, and emits the fluorescent light incident from the wavelength conversion element through the first condensing element in a direction of a second illumination optical axis intersecting the first illumination optical axis at the light separation element, the homogenizer optical element includes a first multi-lens that includes a plurality of first lenses and divides the excitation light into a plurality of excitation partial luminous fluxes with the plurality of first lenses, and a second multi-lens that includes a plurality of second lenses corresponding to the plurality of first lenses and emits the plurality of excitation partial luminous fluxes incident from the first multi-lens toward the light separation element, and the first multi-lens and the second multi-lens are configured to be movable along an orthogonal plane with respect to the first illumination optical axis.

According to the first aspect, by moving the first multi-lens and the second multi-lens included in the homogenizer optical element along the orthogonal plane with respect to the first illumination optical axis, the optical path of the excitation light transmitted through the homogenizer optical element can be changed. According to this, the incident angle of the excitation light with respect to the light separation element can be adjusted, and therefore, the incident angle and incident position of excitation light incident from the light separation element on the first condensing element and thus on the wavelength conversion element can be adjusted. Due to this, the emission angle and emission position of fluorescent light emitted from the wavelength conversion element can be adjusted. Hence, the emission direction and emission position of fluorescent light emitted from the light separation element and thus from the light source device can be adjusted, and therefore, for example, the fluorescent light can be emitted such that the central axis of the fluorescent light coincides with the optical axis of the first lens array. Therefore, the occurrence of illuminance unevenness with respect to the fluorescent light can be suppressed. Accordingly, when the light source device is employed in a projector, the occurrence of color unevenness in a projection image can be suppressed.

In the first aspect, it is preferable that the light source device further includes: a second condensing element that converges incident light; and a diffusing element that diffuses the light converged by the second condensing element, that the light separation element emits light incident through the diffusing element in the direction of the second illumination optical axis, and that the diffusing element is configured to be movable along one illumination optical axis of the first illumination optical axis and the second illumination optical axis, on which the diffusing element is located.

It is preferable that the light diffused by the diffusing element is blue light, and it is preferable that the fluorescent light is light containing green light and red light. In this case, by combining the color lights with the light separation element, the light source device can emit white light.

According to the configuration, the light condensed (converged) by the second condensing element is incident on the diffusing element. The diffusing element is movable along one illumination optical axis of the first illumination optical axis and the second illumination optical axis, on which the diffusing element is disposed. Therefore, by adjusting the position of the diffusing element on the illumination optical axis, the luminous flux diameter of light emitted from the diffusing element can be adjusted. Hence, the luminous flux diameter of light emitted from the light separation element in the same direction as the fluorescent light can be coincident with the luminous flux diameter of the fluorescent light, and therefore, for example, these lights can be incident in substantially the same region on the first lens array. Accordingly, when the light source device is employed in a projector, the occurrence of the illuminance unevenness and the color unevenness can be reliably suppressed.

In the first aspect, it is preferable that the light source device further includes: a second condensing element that converges incident light; and a diffusing element that diffuses the light converged by the second condensing element, that the light separation element emits light incident through the diffusing element in the direction of the second illumination optical axis, and that the second condensing element is configured to be movable along an orthogonal plane with respect to one illumination optical axis of the first illumination optical axis and the second illumination optical axis, on which the second condensing element is located.

The light diffused by the diffusing element and the fluorescent light are similar to those described above.

According to the configuration, by moving the second condensing element along the orthogonal plane with respect to one illumination optical axis of the first illumination optical axis and the second illumination optical axis, on which the second condensing element is located, the incident position of diffused light through the diffusing element on the light separation element can be adjusted, and thus, the emission position of the diffused light emitted from the light separation element can be adjusted. Hence, for example, the central axis of the diffused light can be coincident with the central axis of the fluorescent light, and thus, the diffused light can be incident so as to be coincident with the optical axis of the first lens array. Accordingly, when the light source device is employed in a projector, the occurrence of the illuminance unevenness and the color unevenness can be reliably suppressed.

In the first aspect, it is preferable that the wavelength conversion element is configured to be movable along one illumination optical axis of the first illumination optical axis and the second illumination optical axis, on which the wavelength conversion element is located.

According to the configuration, by adjusting the position of the wavelength conversion element on one illumination optical axis of the first illumination optical axis and the second illumination optical axis, on which the wavelength conversion element is located, the luminous flux diameter of fluorescent light emitted from the wavelength conversion element can be adjusted. Hence, for example, the fluorescent light can be reliably incident in a proper region on the first lens array. Accordingly, when the light source device is employed in a projector, the occurrence of the illuminance unevenness and the color unevenness can be reliably suppressed.

A light source device according to a second aspect of the invention includes: a light source section that emits excitation light; a homogenizer optical element on which the excitation light is incident; a light separation element that separates first excitation light and second excitation light from the excitation light incident through the homogenizer optical element; a first condensing element that converges the first excitation light separated by the light separation element; and a wavelength conversion element on which the first excitation light converged by the first condensing element is incident and that emits fluorescent light, wherein a second condensing element that converges the second excitation light separated by the light separation element, a diffusing element that diffusely reflects the second excitation light converged by the second condensing element, the light source section, the homogenizer optical element, and the light separation element are disposed on a first illumination optical axis, the first condensing element and the wavelength conversion element are disposed on one illumination optical axis of the first illumination optical axis and a second illumination optical axis intersecting the first illumination optical axis at the light separation element, the second condensing element and the diffusing element are disposed on the other illumination optical axis of the first illumination optical axis and the second illumination optical axis, the light separation element emits, in substantially the same direction, the fluorescent light incident from the wavelength conversion element through the first condensing element and the second excitation light diffusely reflected by the diffusing element through the second condensing element and incident on the light separation element, the homogenizer optical element includes a first multi-lens that includes a plurality of first lenses and divides the excitation light into a plurality of partial luminous fluxes with the plurality of first lenses, and a second multi-lens that includes a plurality of second lenses corresponding to the plurality of first lenses and emits the plurality of partial luminous fluxes incident from the first multi-lens toward the light separation element, the first multi-lens and the second multi-lens are configured to be movable along an orthogonal plane with respect to the first illumination optical axis, the wavelength conversion element is configured to be movable along the one illumination optical axis of the first illumination optical axis and the second illumination optical axis, on which the wavelength conversion element is disposed, the diffusing element is configured to be movable along the other illumination optical axis of the first illumination optical axis and the second illumination optical axis, on which the diffusing element is disposed, and the second condensing element is configured to be movable along an orthogonal plane with respect to the other illumination optical axis of the first illumination optical axis and the second illumination optical axis, on which the second condensing element is disposed.

According to the second aspect, advantageous effects similar to those of the light source device according to the first aspect can be provided.

An illumination device according to a third aspect of the invention includes: the light source device; and a homogenizing device that homogenizes an illuminance distribution in a region to be illuminated by light emitted from the light source device, wherein the homogenizing device includes a first lens array that includes a plurality of small lenses and divides a luminous flux incident from the light source device into a plurality of partial luminous fluxes, a second lens array that includes a plurality of small lenses corresponding to the plurality of small lenses and on which the plurality of partial luminous fluxes are incident from the first lens array, and a superimposing lens that superimposes the plurality of partial luminous fluxes through the second lens array onto the region to be illuminated.

According to the third aspect, the luminous flux can be properly incident from the light source device on the first lens array dividing the incident luminous flux into the plurality of partial luminous fluxes, and therefore, the occurrence of illuminance unevenness on the region to be illuminated can be suppressed. In addition, when the illumination device is employed in a projector and the region to be illuminated is set on a light modulating device that forms an image, the occurrence of the color unevenness in a projection image can be suppressed.

A projector according to a fourth aspect of the invention includes: the illumination device; a light modulating device that modulates light emitted from the illumination device; and a projection optical device that projects the light modulated by the light modulating device, wherein the region to be illuminated is set on the light modulating device.

According to the fourth aspect, advantageous effects similar to those of the illumination device according to the third aspect can be provided. Due to this, the occurrence of color unevenness in a projection image can be suppressed.

DESCRIPTION OF EMBODIMENTS

First Embodiment

Hereinafter, a first embodiment of the invention will be described based on the drawings.
Schematic Configuration of Projector
FIG. 1 is a schematic view showing the configuration of a projector 1 according to the embodiment.

The projector 1 according to the embodiment is a display device that modulates light emitted from an illumination device 31 provided therein to form an image in response to image information and enlarges and projects the image onto a screen SC as a projection surface.

Although described in detail later, one of the features of the projector 1 resides in that, in order to suppress the occurrence of color unevenness in a projection image due to the occurrence of illuminance unevenness on light modulating devices 34 because of the occurrence of misalignment or the like in optical components, a plurality of optical components constituting the illumination device 31 are configured to be individually adjustable in position.

Figure 1:
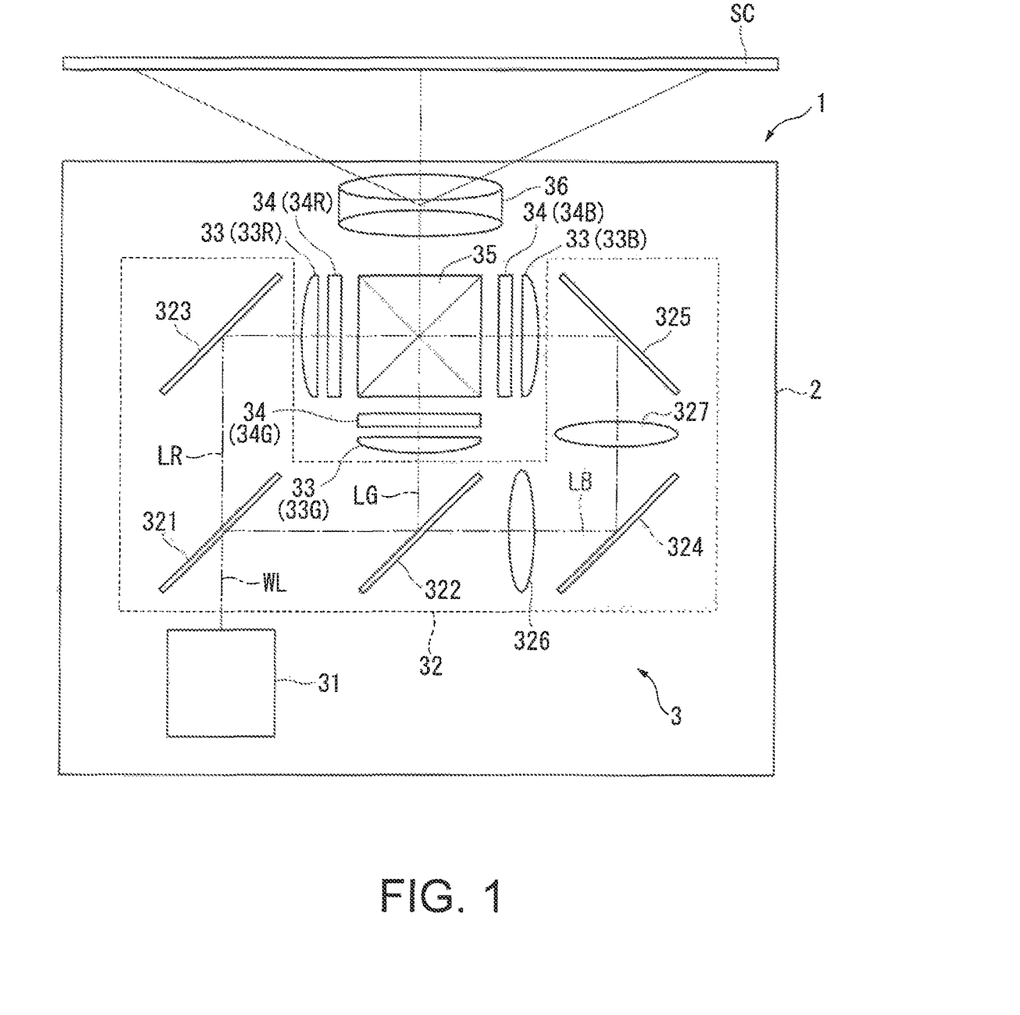
FIG. 1 is a schematic view showing the configuration of a projector according to a first embodiment of the invention.

As shown in FIG. 1, the projector 1 includes an external housing 2 and an optical unit 3 accommodated in the external housing 2. In addition, although not shown in the drawing, the projector 1 includes a control device that controls the projector 1, a cooling device that cools objects to be cooled such as optical components, and a power supply device that supplies power to electronic components.
Configuration of Optical Unit
The optical unit 3 includes the illumination device 31, a color separation device 32, parallelizing lenses 33, the light modulating devices 34, a color combining device 35, and a projection optical device 36.

The illumination device 31 emits illumination light WL. The configuration of the illumination device 31 will be described in detail later.

The color separation device 32 separates the illumination light WL incident from the illumination device 31 into red light LR, green light LG, and blue light LB. The color separation device 32 includes dichroic mirrors 321 and 322, reflection mirrors 323, 324, and 325, and relay lenses 326 and 327.

In these components, the dichroic mirror 321 separates the red light LR and the other color lights (the green light LG and the blue light LB) from the illumination light WL. The separated red light LR is reflected by the reflection mirror 323, and directed to the parallelizing lens 33 (33R). The separated other color lights are incident on the dichroic mirror 322.

The dichroic mirror 322 separates the green light LG and the blue light LB from the other color lights. The separated green light LG is directed to the parallelizing lens 33 (33G). The separated blue light LB is directed to the parallelizing lens 33 (33B) through the relay lens 326, the reflection mirror 324, the relay lens 327, and the reflection mirror 325.

The parallelizing lenses 33 (parallelizing lenses for the respective color lights LR, LG, and LB of red, green, and blue are respectively referred to as 33R, 33G, and 33B) parallelize incident light.

The light modulating devices 34 (light modulating devices for the respective color lights LR, LG, and LB of red, green, and blue are respectively referred to as 34R, 34G, and 34B) modulate the color lights LR, LG, and LB, which are respectively incident thereon, to form image lights in response to image information. The light modulating devices 34 are configured to include a liquid crystal panel that modulates incident color light, and a pair of polarizers that are disposed on the incident and exiting sides of each of the light modulating devices 34R, 34G, and 34B. A region to be illuminated by the illumination device 31, which will be described later, is set, on the light modulating device 34, to an image forming region (modulation region) where the incident color light is modulated to form an image.

The color combining device 35 combines image lights (image lights respectively formed by the color lights LR, LG, and LB) incident from the light modulating devices 34R, 34G, and 34B. The color combining device 35 can be configured of, for example, a cross dichroic prism, but may be configured of a plurality of dichroic mirrors.

The projection optical device 36 projects the image light combined by the color combining device 35 onto the screen SC as a projection surface. As the projection optical device, although not shown in the drawing, a coupling lens including a plurality of lenses disposed in a lens barrel can be employed.

An enlarged image is projected onto the screen SC by the optical unit 3.

Configuration of Illumination Device

Figure 2:
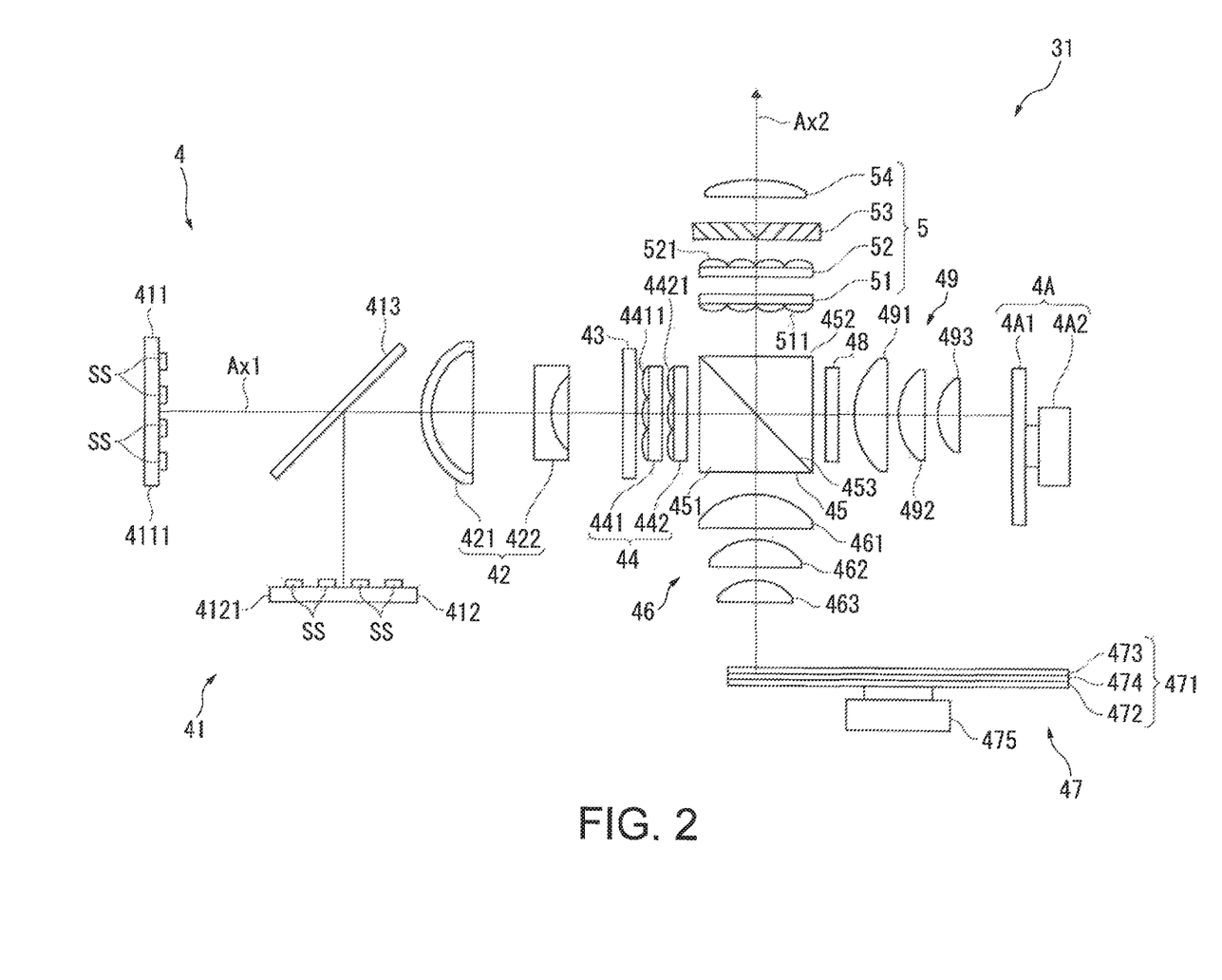
FIG. 2 is a schematic view showing the configuration of an illumination device in the first embodiment.

FIG. 2 is a schematic view showing the configuration of the illumination device 31.

The illumination device 31 emits the illumination light WL toward the color separation device 32 as described above. As shown in FIG. 2, the illumination device 31 includes a light source device 4 and a homogenizing device 5.

Configuration of Light Source Device

The light source device 4 emits a luminous flux to the homogenizing device 5. The light source device 4 includes a light source section 41, an afocal optical element 42, a first retardation element 43, a homogenizer optical element 44, a light separation element 45, a first condensing element 46, a wavelength conversion device 47, a second retardation element 48, a second condensing element 49, and a diffusing element 4A.

In these components, the light source section 41, the afocal optical element 42, the first retardation element 43, the homogenizer optical element 44, the light separation element 45, the second retardation element 48, the second condensing element 49, and the diffusing element 4A are disposed on a first illumination optical axis Ax1 set in the light source device 4. The light separation element 45 is disposed at an intersection portion of the first illumination optical axis Ax1 and a second illumination optical axis Ax2 orthogonal to the first illumination optical axis Ax1.

On the other hand, the first condensing element 46 and the wavelength conversion device 47 are disposed on the second illumination optical axis Ax2.

Configuration of Light Source Section

The light source section 41 emits excitation light as blue light toward the afocal optical element 42. The light source section 41 includes a first light source section 411, a second light source section 412, and a light combining member 413.

The first light source section 411 includes a solid-state light source array 4111 in which a plurality of solid-state light sources SS as laser diodes (LDs) are arranged in a matrix, and a plurality of parallelizing lenses (not shown) corresponding to the solid-state light sources SS. Similarly, the second light source section 412 includes a solid-state light source array 4121 in which a plurality of solid-state light sources SS are arranged in a matrix, and a plurality of parallelizing lenses (not shown) corresponding to the solid-state light sources SS. The solid-state light sources SS emit excitation light having, for example, a peak wavelength of 440 nm, but may emit excitation light having a peak wavelength of 446 nm. Moreover, solid-state light sources that respectively emit excitation lights having peak wavelengths of 440 nm and 446 nm may be mixed into each of the light source sections 411 and 412. The excitation lights emitted from the solid-state light sources SS are parallelized by the parallelizing lenses, and incident on the light combining member 413. In the embodiment, the excitation light emitted from each of the solid-state light sources SS is S-polarized light.

The light combining member 413 transmits the excitation light emitted along the first illumination optical axis Ax1 from the first light source section 411, and reflects the excitation light emitted along a direction orthogonal to the first illumination optical axis Ax1 from the second light source section 412 so as to be along the first illumination optical axis Ax1, to thereby combine the excitation lights. Although not shown in detail in the drawing, the light combining member 413 is configured as a plate-like body in which a plurality of transmitting portions that are disposed at the incident positions of excitation lights emitted from the first light source section 411 and transmit the excitation lights, and a plurality of reflecting portions that are disposed at the incident positions of excitation lights emitted from the second light source section 412 and reflect the excitation lights, are alternately arranged. The excitation light through the light combining member 413 is incident on the afocal optical element 42.

Configuration of Afocal Optical Element

The afocal optical element 42 adjusts the luminous flux diameter of excitation light incident from the light source section 41. Specifically, the afocal optical element 42 is an optical element that condenses the excitation light incident as parallel light from the light source section 41 to reduce the luminous flux diameter, further parallelizes the excitation light, and emits the excitation light. The afocal optical element 42 is configured to include lenses 421 and 422 that are respectively a convex lens and a concave lens. The excitation light emitted from the light source section 41 is condensed by the afocal optical element 42, and incident on the first retardation element 43 and thus on the homogenizer optical element 44.

Configuration of First Retardation Element

The first retardation element 43 is a half-wave plate. The excitation light that is S-polarized light emitted from the light source section 41 transmits through the first retardation element 43, so that a portion of the S-polarized light is converted to P-polarized light and the excitation light is converted to light containing the S-polarized light and the P-polarized light mixed together. The excitation light transmitted through the first retardation element 43 is incident on the homogenizer optical element 44.

In the embodiment, the first retardation element 43 is configured to be rotatable about the optical axis (coincident with the first illumination optical axis Ax1) of the first retardation element 43. With the first retardation element 43 being rotated, the ratio of the S-polarized light to the P-polarized light in the excitation light transmitted through the first retardation element 43 can be adjusted according to the rotating amount (rotating angle) of the first retardation element 43.

Configuration of Homogenizer Optical Element

The homogenizer optical element 44 homogenizes an illuminance distribution of excitation light incident on a phosphor layer 473 as a region to be illuminated in the wavelength conversion device 47, which will be described later. The homogenizer optical element 44 includes a first multi-lens 441 and a second multi-lens 442.

The first multi-lens 441 has a configuration in which a plurality of first lenses 4411 are arranged in a matrix in an orthogonal plane with respect to the first illumination optical axis Ax1. The first multi-lens 441 divides incident excitation light into a plurality of partial luminous fluxes (excitation partial luminous fluxes) with the plurality of first lenses 4411.

The second multi-lens 442 has a configuration in which a plurality of second lenses 4421 corresponding to the plurality of first lenses 4411 are arranged in a matrix in an orthogonal plane with respect to the first illumination optical axis Ax1. In addition, the second multi-lens 442 superimposes, in cooperation with the second lenses 4421 and the second condensing element 49, the plurality of excitation partial luminous fluxes divided by the first lenses 4411 onto the phosphor layer 473 as the region to be illuminated. Due to this, the illuminance of excitation light incident on the phosphor layer 473 in a plane (in an orthogonal plane with respect to the second illumination optical axis Ax2) orthogonal to the central axis of the excitation light is homogenized.

The excitation light through the homogenizer optical element 44 is incident on the light separation element 45.

The multi-lenses 441 and 442 constituting the homogenizer optical element 44 are configured to be movable along the orthogonal plane with respect to the first illumination optical axis Ax1. That is, although not shown in the drawing, the homogenizer optical element 44 includes a first frame body that supports the first multi-lens 441, a second frame body that movably supports the first frame body along one axis of the two axes orthogonal to the first illumination optical axis Ax1, and a third frame body that movably supports the second frame body along the other axis. Moreover, the homogenizer optical element 44 includes another first frame body that supports the second multi-lens 442, another second frame body that movably supports the first frame body along one axis of the two axes orthogonal to the first illumination optical axis Ax1, and another third frame body that movably supports the second frame body along the other axis. With the multi-lenses 441 and 442 being moved, the traveling direction of excitation light emitted from the homogenizer optical element 44 is adjusted.

The multi-lenses 441 and 442 may not be movable independently of each other, but the multi-lenses 441 and 442 may be simultaneously movable.

Configuration of Light Separation Element

The light separation element 45 is a prism-type polarizing beam splitter (PBS), in which prisms 451 and 452 each formed in a substantially triangular prism shape are bonded together at the interfaces and thus formed in a substantially rectangular parallelepiped shape as a whole. The interfaces of the prisms 451 and 452 are inclined at approximately 45° with respect to each of the first illumination optical axis Ax1 and the second illumination optical axis Ax2. A polarization separation layer 453 having wavelength selectivity is formed at the interface of the prism 451 located on the homogenizer optical element 44 side (i.e., the light source section 41 side) in the light separation element 45.

The polarization separation layer 453 has the characteristic of separating S-polarized light (first excitation light) and P-polarized light (second excitation light) that are contained in excitation light, and in addition, has the characteristic of transmitting fluorescent light that is generated when excitation light is incident on the wavelength conversion device 47, which will be described later, irrespective of the polarization state of the fluorescent light. That is, the polarization separation layer 453 has a wavelength-selective polarization separation characteristic of separating S-polarized light and P-polarized light with respect to light in a predetermined wavelength range and transmitting S-polarized light and P-polarized light with respect to light in the other predetermined wavelength ranges.

With the light separation element 45, P-polarized light of excitation light incident from the homogenizer optical element 44 is transmitted to the second retardation element 48 side along the first illumination optical axis Ax1, while S-polarized light is reflected to the first condensing element 46 side along the second illumination optical axis Ax2. That is, the light separation element 45 emits the P-polarized light of the excitation light toward the second retardation element 48 (and thus toward the diffusing element 4A), and emits the S-polarized light toward the first condensing element 46.

Configuration of First Condensing Element

The excitation light that is S-polarized light passing through the homogenizer optical element 44 and reflected by the polarization separation layer 453 is incident on the first condensing element 46. The first condensing element 46 condenses (converges) the excitation light onto a wavelength conversion element 471. In addition, the first condensing element 46 condenses and parallelizes fluorescent light emitted from the wavelength conversion element 471, and emits the fluorescent light toward the polarization separation layer 453. The number of lenses constituting the first condensing element 46 is configured of three pickup lenses 461 to 463. However, the number of lenses constituting the first condensing element 46 is not limited to three.

Configuration of Wavelength Conversion Device

The wavelength conversion device 47 converts incident excitation light to fluorescent light. The wavelength conversion device 47 includes the wavelength conversion element 471 and a rotating device 475.

In these components, the rotating device 475 is configured of a motor or the like that rotates the wavelength conversion element 471 formed in a flat plate shape.

The wavelength conversion element 471 includes: a substrate 472; and the phosphor layer 473 and a reflection layer 474, which are located on the surface of the substrate 472 on the incident side of excitation light.

The substrate 472 is formed in a substantially circular shape as viewed from the incident side of excitation light. The substrate 472 can be configured of metal, ceramics, or the like.

The phosphor layer 473 contains a phosphor that emits, through excitation by incident excitation light, fluorescent light (fluorescent light having a peak wavelength in the wavelength range of, e.g., 500 to 700 nm) as unpolarized light. A portion of the fluorescent light generated by the phosphor layer 473 is emitted to the first condensing element 46 side, and another portion is emitted to the reflection layer 474 side.

The reflection layer 474 is disposed between the phosphor layer 473 and the substrate 472, and reflects the fluorescent light incident from the phosphor layer 473 to the first condensing element 46 side.

When excitation light is radiated onto the wavelength conversion element 471, the fluorescent light is diffusely emitted by the phosphor layer 473 and the reflection layer 474 to the first condensing element 46 side. Then, the fluorescent light is incident on the polarization separation layer 453 of the light separation element 45 through the first condensing element 46, transmits through the polarization separation layer 453 along the second illumination optical axis Ax2, and is incident on the homogenizing devices. That is, the fluorescent light generated by the wavelength conversion element 471 is emitted by the light separation element 45 in the direction of the second illumination optical axis Ax2.

The wavelength conversion device 47 is configured such that at least the position of the phosphor layer 473 is movable along the second illumination optical axis Ax2 with respect to the first condensing element 46. Specifically, in the embodiment, the entire wavelength conversion device 47 is configured to be movable along the second illumination optical axis Ax2. That is, although not shown in the drawing, the wavelength conversion device 47 includes a moving mechanism that movably supports the rotating device 475 along the second illumination optical axis Ax2. With the wavelength conversion device 47 (the phosphor layer 473) being moved as described above, the defocus position of excitation light with respect to the phosphor layer 473 can be adjusted. Hence, the luminous flux diameter of fluorescent light diffusely emitted from the wavelength conversion device 47 can be adjusted, and thus, the luminous flux diameter of the fluorescent light transmitted through the polarization separation layer 453 and traveling toward the homogenizing device 5 can be adjusted.

Configurations of Second Retardation Element, Second Condensing Element, and Diffusing Element The second retardation element 48 is a quarter-wave plate, and converts the polarization state of excitation light (linearly polarized light) incident from the light separation element 45 to circular polarization.

The second condensing element 49 is an optical element that condenses (converges) excitation light transmitted through the second retardation element 48 onto the diffusing element 4A, and is configured of three pickup lenses 491 to 493 in the embodiment. However, similarly to the first condensing element 46, the number of lenses constituting the second condensing element 49 is not limited to three.

The diffusing element 4A diffusely reflects incident excitation light at a diffusion angle similar to that of the fluorescent light generated and emitted by the wavelength conversion device 47. The diffusing element 4A includes a reflector 4A1 that causes the Lambertian reflection of incident light, and a rotating device 4A2 that rotates the reflector 4A1 for cooling.

The excitation light diffusely reflected by the diffusing element 4A is incident again on the second retardation element through the second condensing element 49. Circularly polarized light incident on the diffusing element 4A is converted to reversed circularly polarized light when reflected by the diffusing element 4A, and in the course of transmitting through the second retardation element 48, the reversed circularly polarized light is converted to excitation light of S-polarized light that is rotated by 90° with respect to the polarization of excitation light. Then, the excitation light is reflected by the polarization separation layer 453, and incident as blue light on the homogenizing device 5 along the second illumination optical axis Ax2. That is, the excitation light diffusely reflected by the diffusing element 4A is emitted by the light separation element 45 in the direction of the second illumination optical axis Ax2.

The second condensing element 49 is configured to be movable along the orthogonal plane with respect to the first illumination optical axis Ax1. That is, although not shown in the drawing, the second condensing element 49 includes a holding body that holds the pickup lenses 491 to 493, a first support body that movably supports the holding body along one axis of the two axes orthogonal to the first illumination optical axis Ax1, and a second support body that movably supports the first support body along the other axis. With the second condensing element 49 being moved as described above, it is possible to adjust the incident angle of excitation light (blue light) diffused by the diffusing element 4A with respect to the polarization separation layer 453, and thus the inclination angle of the excitation light reflected by the polarization separation layer 453 and traveling toward the homogenizing device 5 with respect to the second illumination optical axis Ax2. Since the optical path of excitation light passing through the homogenizer optical element 44 is changed when the homogenizer optical element 44 is moved, the optical path of excitation light passing through the second condensing element 49 is also changed. Because of this fact, the movement of the second condensing element 49 has also the function of supplementing the change in the optical path of blue light due to the movement of the homogenizer optical element 44.

Moreover, in the embodiment, the diffusing element 4A is configured to be movable along the first illumination optical axis Ax1. That is, although not shown in the drawing, the diffusing element 4A includes a moving mechanism that movably supports the rotating device 4A2 along the first illumination optical axis Ax1. With the diffusing element 4A being moved as described above, the luminous flux diameter of excitation light incident on the diffusing element 4A can be adjusted. Therefore, it is possible to adjust the luminous flux diameter of excitation light diffused by the diffusing element 4A, and thus the luminous flux diameter of the excitation light reflected by the polarization separation layer 453 and traveling toward the homogenizing device 5.

As described above, the S-polarized light (first excitation light) of the excitation light incident on the light separation element 45 through the homogenizer optical element 44 is wavelength-converted to the fluorescent light by the wavelength conversion device 47, and thereafter transmits through the light separation element 45 to be incident on the homogenizing device 5. On the other hand, the P-polarized light (second excitation light) is incident on the diffusing element 4A to thereby be diffusely reflected, transmits twice through the second retardation element 48, is reflected by the light separation element 45, and incident as blue light on the homogenizing device 5. That is, the blue light, the green light, and the red light are combined by the light separation element 45 to be emitted in the direction of the second illumination optical axis Ax2, and incident as the illumination light WL of white on the homogenizing device 5.

Configuration of Homogenizing Device

The homogenizing device 5 homogenizes the illuminance of the illumination light WL incident from the light source device 4 on an orthogonal plane (optical axis orthogonal plane) with respect to the central axis of the illumination light WL. Specifically, the homogenizing device 5 homogenizes an illuminance distribution of a luminous flux in an image forming region (modulation region) as a region to be illuminated in each of the light modulating devices 34 (34R, 34G, 34B). The homogenizing device 5 includes a first lens array 51, a second lens array 52, a polarization conversion element 53, and a superimposing lens 54. These configurations 51 to 54 are disposed such that the optical axes thereof coincide with the second illumination optical axis Ax2.

The first lens array 51 has a configuration in which a plurality of small lenses 511 each of which is a small lens are arranged in a matrix in an optical axis orthogonal plane (orthogonal plane with respect to the second illumination optical axis Ax2 in the first lens array 51). The first lens array 51 divides the incident illumination light WL into a plurality of partial luminous fluxes with the plurality of small lenses 511.

Similarly to the first lens array 51, the second lens array 52 has a configuration in which a plurality of small lenses 521 are arranged in a matrix in an optical axis orthogonal plane, and each of the small lenses 521 has a one-to-one relationship with the corresponding small lens 511. That is, a partial luminous flux emitted from the corresponding small lens 511 is incident on a certain small lens 521. The small lenses 521 superimpose, together with the superimposing lens 54, the plurality of partial luminous fluxes divided by the small lenses 511 onto the image forming region of each of the light modulating devices 34.

The polarization conversion element 53 is disposed between the second lens array 52 and the superimposing lens 54, and has the function of aligning the polarization directions of the plurality of partial luminous fluxes incident on the polarization conversion element 53.

Optical Path Adjustment and Luminous Flux Diameter Adjustment of Luminous Flux Emitted from Light Source Device In the light source device 4, due to the positional deviation, tolerances, and the like of the optical components, the optical paths of fluorescent light and blue light that are emitted from the light source device 4 may deviate with respect to the second illumination optical axis Ax2, which is the optical axis of the homogenizing device 5. For example, when the central axis of excitation light emitted from the light source section and incident on the light separation element 45 (the polarization separation layer 453) is inclined with respect to the first illumination optical axis Ax1, the incident angle of excitation light reflected by the polarization separation layer 453 and incident on the wavelength conversion element 471 is inclined with respect to the second illumination optical axis Ax2, and thus, the central axis of fluorescent light emitted from the light source device 4 deviates with respect to the second illumination optical axis Ax2. Moreover, when the central axis of the excitation light is inclined with respect to the first illumination optical axis Ax1, the central axis of excitation light (blue light) reflected by the diffusing element 4A, further reflected by the polarization separation layer 453, and emitted from the light source device 4 deviates with respect to the second illumination optical axis Ax2. In this case, the central axis of the excitation light is likely to deviate also with respect to the central axis of fluorescent light.

When deviation occurs in the optical path of each of the color lights as described above, illuminance unevenness occurs on the light modulating device 34 as the region to be illuminated, which is illuminated by the corresponding color light, and due to this, color unevenness occurs in a projection image. Hence, in the light source device 4, it is necessary to adjust the optical paths of the fluorescent light and the blue light emitted from the light source device 4.

Moreover, also when the luminous flux diameters of the fluorescent light and the blue light emitted from the light source device 4 are different, the illuminance unevenness occurs, and thus, the color unevenness occurs in the projection image.

Accordingly, it is necessary to carry out optical path adjustments (optical axis adjustments) of the fluorescent light and blue light, and in addition, it is necessary to carry out luminous flux diameter adjustments thereof, as described below.

First of all, the optical path and luminous flux diameter of the fluorescent light, which is more powerful than the blue light, are adjusted.

First, by moving the homogenizer optical element 44 (the multi-lenses 441 and 442) along the orthogonal plane with respect to the first illumination optical axis Ax1, the incident angle of excitation light with respect to the wavelength conversion element 471 is adjusted such that the central axis of the fluorescent light emitted from the wavelength conversion element 471 coincides with the second illumination optical axis Ax2. Due to this, the optical path of the fluorescent light is adjusted.

Then, by moving the wavelength conversion device 47 along the second illumination optical axis Ax2, the position of the wavelength conversion device 47 is adjusted such that the fluorescent light emitted from the light source device 4 is incident in a predetermined region of the first lens array 51. Due to this, the luminous flux diameter of the fluorescent light is adjusted.

Next, the optical path and luminous flux diameter of the blue light are adjusted so as to coincide with the optical path and luminous flux diameter of the fluorescent light.

First, by moving the second condensing element 49 along the orthogonal plane with respect to the first illumination optical axis Ax1, the incident position of excitation light reflected by the diffusing element 4A and incident on the light separation element 45 is adjusted so as to coincide with the central axis of the fluorescent light adjusted by the procedure. Due to this, the optical path of the blue light is adjusted.

Then, by moving the diffusing element 4A along the first illumination optical axis Ax1, the position of the diffusing element 4A is adjusted such that the blue light is incident in the predetermined region of the first lens array 51 and that a radiation range of the fluorescent light and a radiation range of the blue light coincide with each other. Due to this, the luminous flux diameter of the blue light is adjusted.

In this manner, by making the optical paths of the fluorescent light and the blue light coincident with each other and making the luminous flux diameters of the fluorescent light and the blue light coincident with each other, the occurrence of the illuminance unevenness on the light modulating device 34 is suppressed, and thus, the occurrence of color unevenness in a projection image is suppressed.

As described above, the first retardation element 43 is configured to be rotatable about the first illumination optical axis Ax1, and due to this, the ratio of the S-polarized light to the P-polarized light contained in the excitation light passing through the first retardation element 43 can be adjusted. Hence, the ratio of the light amount of excitation light incident on the diffusing element 4A to the light amount of excitation light incident on the wavelength conversion device 47, in other words, the ratio of the blue light to the fluorescent light can be adjusted. Accordingly, the white balance of the illumination light WL emitted from the light source device 4 can be adjusted.

According to the projector 1 according to the embodiment described above, the following advantageous effects are provided.

The first multi-lens 441 and the second multi-lens 442 included in the homogenizer optical element 44 are configured to be movable along the orthogonal plane with respect to the first illumination optical axis Ax1. According to this, by moving the multi-lenses 441 and 442, the optical path of excitation light transmitted through the homogenizer optical element 44 can be changed. Hence, the incident angle of the excitation light with respect to the light separation element 45 (the polarization separation layer 453) can be adjusted. Therefore, the incident angle and incident position of the excitation light reflected by the polarization separation layer 453 and incident on the wavelength conversion device 47 can be adjusted, and thus, the emission angle and emission position of fluorescent light emitted from the wavelength conversion device 47 can be adjusted. Due to this, the emission direction and emission position of fluorescent light emitted from the light source device 4 can be adjusted, and therefore, the fluorescent light can be emitted such that the central axis of the fluorescent light coincides with the optical axis of the first lens array 51. Accordingly, with regard to fluorescent light (green light and red light) radiated onto the light modulating device 34 as the region to be illuminated, the occurrence of illuminance unevenness on the light modulating device 34 can be suppressed, and thus, the occurrence of color unevenness in a projection image can be suppressed.

The diffusing element 4A on which excitation light converged by the second condensing element 49 is incident is movable along the first illumination optical axis Ax1. According to this, by adjusting the position of the diffusing element 4A on the first illumination optical axis Ax1, the luminous flux diameter of the excitation light incident on the diffusing element 4A can be adjusted, and thus, the luminous flux diameter of excitation light diffusely reflected by the diffusing element 4A can be adjusted. Hence, the luminous flux diameter of excitation light (blue light) incident again on the light separation element 45 and reflected in the same direction as the direction in which fluorescent light transmits through the light separation element 45 can be coincident with the luminous flux diameter of the fluorescent light. Due to this, the fluorescent light and the blue light can be incident in substantially the same region on the first lens array 51, and therefore, the fluorescent light and the blue light can be incident as one white luminous flux on the first lens array 51. Accordingly, the occurrence of the illuminance unevenness and the color unevenness can be reliably suppressed.

The second condensing element 49 is movable along the orthogonal plane with respect to the first illumination optical axis Ax1. According to this, by moving the second condensing element 49, the incident position of excitation light (diffused light) diffusely reflected by the diffusing element 4A on the light separation element 45 can be adjusted, and thus, the emission direction and emission position of excitation light reflected by and emitted from the light separation element 45 can be adjusted. Hence, the central axis of the excitation light can be coincident with the central axis of the fluorescent light transmitted through the light separation element 45, and thus, the central axes of the excitation light and the fluorescent light can be coincident with the optical axis of the first lens array 51. Accordingly, the occurrence of the illuminance unevenness and the color unevenness can be reliably suppressed.

The wavelength conversion element 471 (the phosphor layer 473) on which excitation light converged by the first condensing element 46 is incident is configured to be movable along the second illumination optical axis Ax2. Hence, by adjusting the position of the wavelength conversion element 471 on the second illumination optical axis Ax2, the luminous flux diameter of fluorescent light emitted from the wavelength conversion element 471 can be adjusted. Hence, the luminous flux diameter of the fluorescent light can be easily coincident with the luminous flux diameter of excitation light (blue light) emitted from the light source device 4, and in addition, the fluorescent light can be reliably incident in a proper region (e.g., substantially the entire surface on which the small lenses 511 are arranged) on the first lens array 51. Accordingly, the occurrence of the illuminance unevenness and the color unevenness can be reliably suppressed.

Second Embodiment

Next, a second embodiment of the invention will be described.

Figure 3:
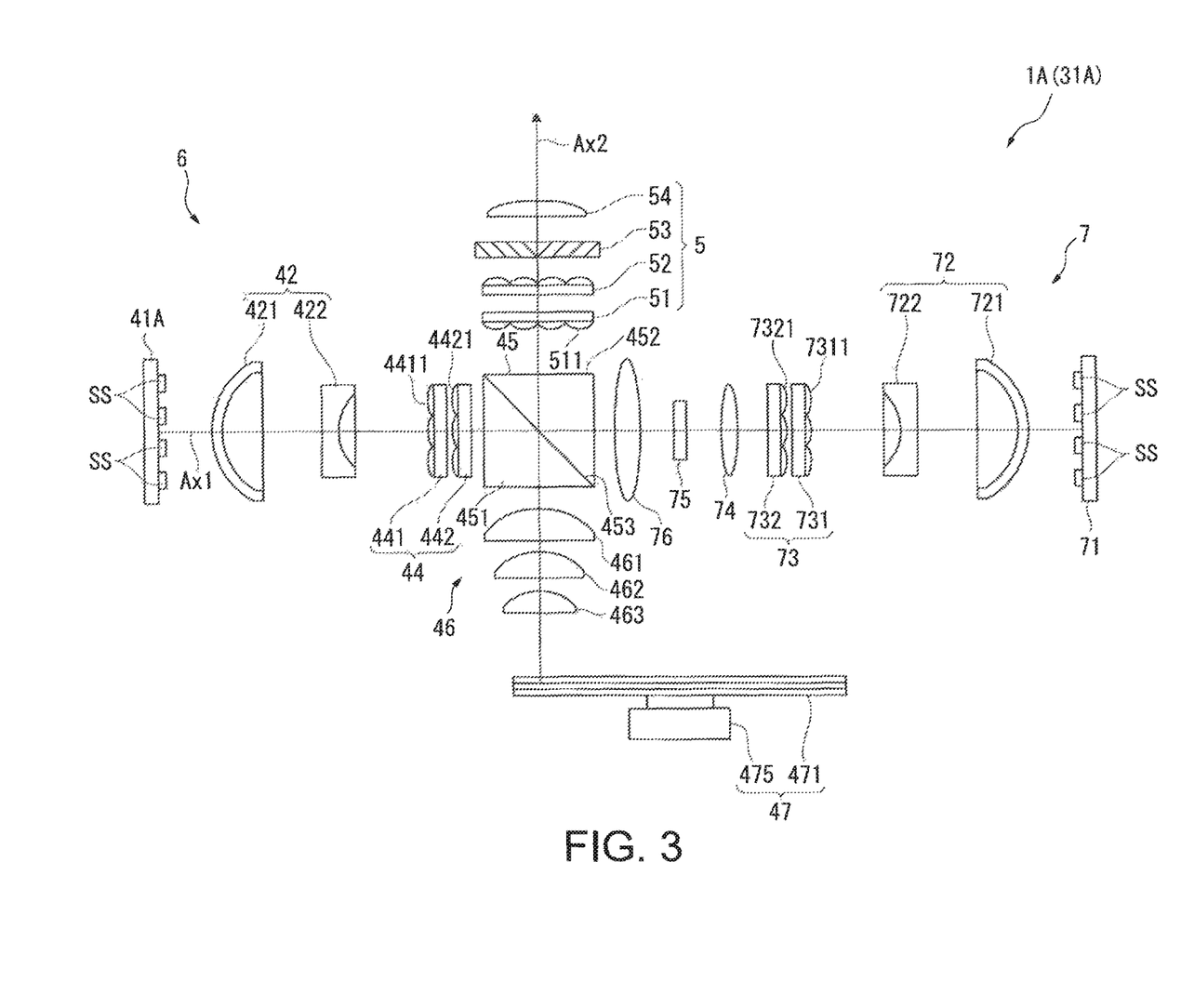
FIG. 3 is a schematic view showing the configuration of an illumination device included in a projector according to a second embodiment of the invention.

A projector according to the embodiment has configurations similar to those of the projector 1. Here, in the projector 1, the blue light contained in the illumination light WL is a portion of the excitation light emitted from the light source section 41. The projector 1 is configured to include the diffusing element 4A, which diffusely reflects a portion of the excitation light incident from the light separation element 45 and returns the portion back to the light separation element 45. In contrast, the projector according to the embodiment includes a light source section that emits blue light, and a transmissive diffusing element that diffusely transmits the blue light and causes the blue light to be incident on the light separation element 45. In these respects, the projector according to the embodiment and the projector 1 are different. In the following description, the same or substantially the same portions as those previously described are denoted by the same reference numerals and signs, and the description thereof is omitted.

FIG. 3 is a schematic view showing the configuration of an illumination device 31A included in the projector 1A according to the embodiment.

The projector 1A according to the embodiment has configurations and functions similar to those of the projector 1 except that the projector 1A includes the illumination device 31A instead of the illumination device 31. Moreover, the illumination device 31A has configurations and functions similar to those of the illumination device 31 except that the illumination device 31A includes a light source device 6 instead of the light source device 4.

As shown in FIG. 3, the light source device 6 emits the illumination light WL containing blue light and fluorescent light toward the homogenizing device 5, similarly to the light source device 4. The light source device 6 includes: a light source section for excitation 41A, the afocal optical element 42, the homogenizer optical element 44, and the light separation element 45, which are disposed on the first illumination optical axis Ax1; the first condensing element 46 and the wavelength conversion device 47, which are disposed on the second illumination optical axis Ax2; and a blue light emitting device 7, which is disposed on the first illumination optical axis Ax1.

Configuration of Light Source Section for Excitation

The light source section for excitation 41A corresponds to a light source section of the invention. The light source section for excitation 41A includes, similarly to the first light source section 411 and the second light source section 412, a plurality of solid-state light sources SS arranged in a matrix in an orthogonal plane with respect to the first illumination optical axis Ax1, and a plurality of parallelizing lenses (not shown) corresponding to the solid-state light sources SS. The light source section for excitation 41A emits the excitation light of S-polarization.

The excitation light emitted from the light source section for excitation 41A transmits through the afocal optical element 42 and the homogenizer optical element 44, is incident on the light separation element 45, and reflected by the polarization separation layer 453 of the light separation element 45 toward the first condensing element 46. Similarly to the case of the light source device 4, the excitation light is incident on the wavelength conversion device 47 through the first condensing element 46, and wavelength-converted to fluorescent light. The fluorescent light transmits through the first condensing element 46 and the light separation element 45, and is incident on the homogenizing device 5.

Configuration of Blue Light Emitting Device

The blue light emitting device 7 emits diffused blue light onto the surface of the light separation element 45 on the side opposite to the surface thereof on which excitation light transmitted through the homogenizer optical element 44 is incident. The blue light emitting device 7 includes a light source section for blue 71, an afocal optical element 72, a homogenizer optical element 73, a condensing element 74, a diffusing element 75, and a parallelizing element 76.

Configurations of Light Source Section for Blue and Afocal Optical Element

The light source section for blue 71 has configurations similar to those of the light source section for excitation 41A. That is, the light source section for blue 71 includes a plurality of solid-state light sources SS arranged in a matrix in the orthogonal plane with respect to the first illumination optical axis Ax1, and a plurality of parallelizing lenses (not shown) corresponding to the solid-state light sources SS. The light source section for blue 71 emits blue light of S-polarization in a direction opposite to the light source section for excitation 41A.

The afocal optical element 72 is configured to include lenses 721 and 722 that are respectively a convex lens and a concave lens, similarly to the afocal optical element 42. The afocal optical element 72 parallelizes, while condensing, the blue light emitted from the light source section for blue 71, and emits the blue light to the homogenizer optical element 73.

Configuration of Homogenizer Optical Element

The homogenizer optical element 73 includes a first multi-lens 731 and a second multi-lens 732 similar to the first multi-lens 441 and the second multi-lens 442 included in the homogenizer optical element 44. In the homogenizer optical element 73, similarly to the homogenizer optical element 44, first lenses 7311 of the first multi-lens 731 divide incident blue light into a plurality of partial luminous fluxes, and second lenses 7321 of the second multi-lens 732 superimpose the plurality of partial luminous fluxes onto the diffusing element 75.

Also in the homogenizer optical element 73, the multi-lenses 731 and 732 are configured to be movable independently of each other along the orthogonal plane with respect to the first illumination optical axis Ax1. That is, although not shown in the drawing, the homogenizer optical element 73 has configurations similar to the frame bodies included in the homogenizer optical element 44, and includes first to third frame bodies that support each of the multi-lenses 731 and 732. By moving the multi-lenses 731 and 732, the traveling direction of blue light emitted from the homogenizer optical element 73 is adjusted.

Configuration of Condensing Element

The condensing element 74 corresponds to a second condensing element of the invention. The condensing element 74 superimposes, together with the second lenses 7321, blue light (the plurality of partial luminous fluxes divided by the homogenizer optical element 73) incident from the homogenizer optical element 73 onto the diffusing element 75, and also converges the blue light onto the diffusing element 75.

Configuration of Diffusing Element

The diffusing element 75 diffusely transmits incident blue light and causes the blue light to be incident on the parallelizing element 76. Specifically, when transmitting incident blue light, the diffusing element 75 diffuses the blue light at a diffusion angle similar to that of the Lambertian reflection. As the diffusing element 75, a hologram, a multi-lens in which a plurality of small lenses are arranged in an optical axis orthogonal plane, or a configuration including a rough surface on which minute irregularities are formed can be exemplified.

Also the diffusing element 75 is movable along the first illumination optical axis Ax1 similarly to the diffusing element 4A. That is, although not shown in the drawing, the diffusing element 75 includes a substrate that diffusely transmits blue light, and a moving mechanism that movably supports the substrate along the first illumination optical axis Ax1. Due to this, the luminous flux diameter of excitation light incident on the diffusing element 75 can be adjusted. Therefore, the luminous flux diameter of blue light diffused by the diffusing element 75, and thus, the luminous flux diameter of the blue light reflected by the polarization separation layer 453 and traveling toward the homogenizing device 5 can be adjusted.

Configuration of Parallelizing Element

The parallelizing element 76 parallelizes incident blue light diffused by the diffusing element 75, and causes the blue light to be incident on the surface of the light separation element 45 on the side opposite to the incident side of excitation light.

The blue light incident on the light separation element 45 as described above is S-polarized light, and therefore is reflected by the polarization separation layer 453 and incident on the homogenizing device 5 along the second illumination optical axis Ax2.

Optical Path Adjustment and Luminous Flux Diameter Adjustment of Luminous Flux Emitted from Light Source Device Because of the problems of the illuminance unevenness and color unevenness described above, also in the light source device 6 in the embodiment, it is necessary to carry out optical path adjustments (optical axis adjustments) of the fluorescent light and the blue light, and in addition, it is necessary to carry out luminous flux diameter adjustments of the fluorescent light and the blue light.

To this end, first, the optical path and luminous flux diameter of the fluorescent light are adjusted also in the embodiment. The adjustments of the optical path and luminous flux diameter of the fluorescent light are similar to those in the case of the light source device 4.

Next, the optical path and luminous flux diameter of the blue light are adjusted so as to coincide with the optical path and luminous flux diameter of the fluorescent light.

First, by moving the multi-lenses 731 and 732 of the homogenizer optical element 73 along the orthogonal plane with respect to the first illumination optical axis Ax1, the emission angle of blue light emitted from the homogenizer optical element 73 is adjusted such that the central axis of blue light reflected by the light separation element 45 to the homogenizing device 5 side and traveling thereto coincides with the central axis of the fluorescent light adjusted by the procedure. Due to this, the optical path of the blue light is adjusted.

Then, by moving the diffusing element 75 along the first illumination optical axis Ax1, the position of the diffusing element 75 is adjusted such that incident blue light is incident in a predetermined region of the first lens array 51 through the parallelizing element 76 and the light separation element 45, and that a radiation range of the fluorescent light and a radiation range of the blue light coincide with each other. Due to this, the luminous flux diameter of the blue light is adjusted.

In this manner, by making the optical paths of the fluorescent light and the blue light coincident with each other and making the luminous flux diameters of the fluorescent light and the blue light coincident with each other, the occurrence of the illuminance unevenness on the light modulating device 34 is suppressed, and thus, the occurrence of color unevenness in a projection image is suppressed.

According to the projector 1A according to the embodiment described above, advantageous effects similar to those of the projector 1 can be provided.

Since the first retardation element 43 is not provided in the light source device 6, substantially all of the excitation light of S-polarization emitted from the light source section 41A is reflected by the polarization separation layer 453 to the first condensing element 46 side. That is, the light source section for excitation 41A, which emits excitation light that is wavelength-converted to fluorescent light to be incident on the homogenizing device 5, and the light source section for blue 71, which emits blue light to be similarly incident on the homogenizing device 5, are independent of each other. Hence, by adjusting the emission light amount of excitation light by the light source section for excitation 41A and the emission light amount of blue light by the light source section for blue 71, the white balance of the illumination light WL can be adjusted.

Moreover, the light separation element 45 may be configured to reflect, with a color separation layer (dichroic film) disposed instead of the polarization separation layer 453, excitation light to the first condensing element 46 side, while reflecting blue light to the homogenizing device 5 side, to thereby transmit fluorescent light to the homogenizing device 5 side.

Modifications of Embodiments

The invention is not limited to the embodiments, and modifications, improvements, and the like within a range capable of achieving the objects of the invention are included in the invention.

The homogenizer optical element 44, the wavelength conversion element 471, the second condensing element 49, and the diffusing element 4A are configured to be movable in the light source device 4, while the homogenizer optical elements 44 and 73, the wavelength conversion element 471, and the diffusing element 75 are configured to be movable in the light source device 6. However, the invention is not limited to this. That is, at least any of these components may be fixed. Moreover, another configuration such as, for example, the light separation element 45 (the polarization separation layer 453) may be configured to be movable along the orthogonal plane with respect to the first illumination optical axis Ax1 or the second illumination optical axis Ax2, or along the first illumination optical axis Ax1 or the second illumination optical axis Ax2.

The homogenizer optical element 44 includes the first frame body supporting the first multi-lens 441, the second frame body movably supporting the first frame body along one axis of the two axes orthogonal to the first illumination optical axis Ax1, and the third frame body movably supporting the second frame body along the other axis. Moreover, the homogenizer optical element 44 is configured to include another first frame body supporting the second multi-lens 442, another second frame body movably supporting the first frame body along one axis of the two axes orthogonal to the first illumination optical axis Ax1, and another third frame body movably supporting the second frame body along the other axis. Further, the homogenizer optical element 73 has configurations similar to those of the homogenizer optical element 44. However, the invention is not limited to this. The mechanism and configuration allowing the first multi-lens and the second multi-lens to be movable along the orthogonal plane with respect to the first illumination optical axis Ax1 can be appropriately changed. That is, the mechanism and configuration do not matter as long as these multi-lenses are movable along the orthogonal plane. The same applies to the mechanism and configuration to move the second condensing element 49, the diffusing elements 4A and 75, and the wavelength conversion element 471.

The projectors 1 and 1A include the three light modulating devices 34 (34R, 34G, 34B) including liquid crystal panels. However, the invention can be applied also to a projector including two or less, or four or more, light modulating devices.

Moreover, the light modulating device 34 is configured to include a transmissive liquid crystal panel whose luminous flux incident and luminous flux exiting surfaces are different. However, the light modulating device 34 may be configured to include a reflective liquid crystal panel whose light incident and light exiting surfaces are the same. In addition, a light modulating device other than that of liquid crystal, such as a device using a micromirror, for example, using a digital micromirror device (DMD) or the like, may be used as long as the light modulating device can modulate an incident luminous flux to form an image in response to image information.

For the optical unit 3, a configuration including the optical components shown in FIG. 1 and the arrangement of the optical components is exemplified. However, the optical unit 3 is not limited to this, and other configuration and arrangement may be employed.

For example, in the illumination device 31, a portion of the excitation light emitted from the light source section 41 is caused to be incident on the wavelength conversion device 47 to generate fluorescent light, and another portion of the excitation light is combined as blue light with the fluorescent light by the light separation element 45 to generate the illumination light WL. Moreover, in the illumination device 31A, the fluorescent light generated by causing the excitation light emitted from the light source section for excitation 41A to be incident on the wavelength conversion device 47 and the blue light emitted from the light source section for blue 71 are combined by the light separation element 45 to generate the illumination light WL. In contrast, a configuration may be employed, in which green light and red light are separated from the fluorescent light generated by the wavelength conversion device 47 based on the excitation light emitted from the light source section for excitation 41A, the green light and the red light are caused to be incident on the light modulating devices 34G and 34R, and the blue light emitted from the light source section for blue 71 is caused to be incident on the light modulating device 34B. In this case, the homogenizing device 5 may be provided on each of the optical path of the fluorescent light and on the optical path of the blue light.

Moreover, the first illumination optical axis Ax1 and the second illumination optical axis Ax2 are orthogonal to each other. However, the invention is not limited to this, and it is sufficient that the first illumination optical axis Ax1 and the second illumination optical axis Ax2 intersect.

The wavelength conversion device 47 is configured to rotate, with the rotating device 475, the substrate 472 including the phosphor layer 473. However, the wavelength conversion device 47 is not limited to this, and the rotating device 475 may be omitted as long as the temperature of the substrate 472 (the phosphor layer 473) can be maintained at a proper temperature. The same applies to the diffusing element 4A.

In the projector 1, the second retardation element 48, the second condensing element 49, and the diffusing element 4A are disposed on the first illumination optical axis Ax1 on which the light source section 41, the afocal optical element 42, the first retardation element 43, the homogenizer optical element 44, and the light separation element 45 are disposed, while the first condensing element 46 and the wavelength conversion device 47 are disposed on the second illumination optical axis Ax2 orthogonal to the first illumination optical axis Ax1 at the light separation element 45. Moreover, in the projector 1A, the blue light emitting device 7 is disposed on the first illumination optical axis Ax1, while the first condensing element 46 and the wavelength conversion device 47 are disposed on the second illumination optical axis Ax2. However, the invention is not limited to this.

For example, in the projector 1, the first condensing element 46 and the wavelength conversion device 47 may be disposed on the first illumination optical axis Ax1, while the second retardation element 48, the second condensing element 49, and the diffusing element 4A may be disposed on the second illumination optical axis Ax2. Similarly, in the projector 1A, the first condensing element 46 and the wavelength conversion device 47 may be disposed on the first illumination optical axis Ax1, while the blue light emitting device 7 may be disposed on the second illumination optical axis Ax2.

In the case of the arrangement described above, by configuring the polarization separation layer 453 of the light separation element 45 to have the characteristic of separating the S-polarized light (first excitation light) and the P-polarized light (second excitation light) contained in excitation light, and the characteristic of reflecting the fluorescent light generated by the wavelength conversion device 47 irrespective of the polarization state of the fluorescent light, fluorescent light generated by the wavelength conversion element 471 is reflected by the light separation element 45 toward the homogenizing device 5, and excitation light (blue light) incident from the diffusing element 4A or the blue light emitting device 7 transmits through the light separation element 45 and is emitted toward the homogenizing device 5.

Also in the projector described above, the order of adjustments of each element is the same. That is, after the optical path and luminous flux diameter of fluorescent light are adjusted with the movement of the multi-lenses 441 and 442 and the wavelength conversion element 471, the optical path and luminous flux diameter of blue light are made coincident with the optical path and luminous flux diameter of the fluorescent light with the movement of the second condensing element 49 or the multi-lenses 731 and 732 and with the movement of the diffusing element 4A or the diffusing element 75.

Moreover, in the projector 1, the S-polarized light (first excitation light) separated by the light separation element 45 is incident on the first condensing element 46 and the wavelength conversion device 47, and the P-polarized light (second excitation light) separated by the light separation element 45 is incident on the second retardation element 48, the second condensing element 49, and the diffusing element 4A. Moreover, in the projector 1A, the S-polarized light emitted from the light source section for excitation 41A is incident on the first condensing element 46 and the wavelength conversion device 47 through the light separation element 45, and the blue light of S-polarization emitted from the light source section for blue 71 is incident on the light separation element 45 through the elements 72 to 76. However, the invention is not limited to this.

For example, in the projector 1, a configuration may be employed, in which the S-polarized light separated by the light separation element 45 is incident on the second retardation element 48, the second condensing element 49, and the diffusing element 4A, the P-polarized light is incident on the first condensing element 46 and the wavelength conversion device 47, and the lights diffusely reflected by the diffusing element 4A and the wavelength conversion element 471 are combined by and emitted from the light separation element 45. Similarly, in the projector 1A, a configuration may be employed, in which the light source section for excitation 41A emits P-polarized light, and the P-polarized light is incident on the first condensing element 46 and the wavelength conversion device 47 through the light separation element 45. Alternatively, a configuration may be employed, in which the light source section for blue 71 emits blue light of P-polarization, and the blue light of P-polarization is incident on the light separation element 45 through the elements 72 to 76. That is, the polarization direction of light incident on the first condensing element 46 and the wavelength conversion device 47, and the polarization direction of light incident on the second retardation element 48, the second condensing element 49, and the diffusing element 4A or the polarization direction of light incident on the light separation element 45 through the elements 72 to 76 can be appropriately changed The entire disclosure of Japanese Patent Application No. 2015-231416, filed Nov. 27, 2015 is expressly incorporated by reference herein.

The invention claimed is:

1. A light source device comprising:
a light source section that emits excitation light;
a homogenizer optical element on which the excitation light is incident;
a first condensing element that converges the excitation light through the homogenizer optical element;
a wavelength conversion element on which the excitation light converged by the first condensing element is incident and that emits fluorescent light; and
a light separation element, wherein
the light source section, the homogenizer optical element, and the light separation element are disposed on a first illumination optical axis,
the light separation element emits at least a portion of the excitation light incident from the homogenizer optical element toward the first condensing element, and emits the fluorescent light incident from the wavelength conversion element through the first condensing element in a direction of a second illumination optical axis intersecting the first illumination optical axis at the light separation element,
the homogenizer optical element includes
a first multi-lens that includes a plurality of first lenses and divides the excitation light into a plurality of excitation partial luminous fluxes with the plurality of first lenses, and
a second multi-lens that includes a plurality of second lenses corresponding to the plurality of first lenses and emits the plurality of excitation partial luminous fluxes incident from the first multi-lens toward the light separation element, and
the first multi-lens and the second multi-lens are configured to be movable along an orthogonal plane with respect to the first illumination optical axis.

2. The light source device according to claim 1, further comprising:
a second condensing element that converges incident light; and
a diffusing element that diffuses the light converged by the second condensing element, wherein
the light separation element emits light incident through the diffusing element in the direction of the second illumination optical axis, and
the diffusing element is configured to be movable along one illumination optical axis of the first illumination optical axis and the second illumination optical axis, on which the diffusing element is located.

3. The light source device according to claim 1, further comprising:
a second condensing element that converges incident light; and
a diffusing element that diffuses the light converged by the second condensing element, wherein
the light separation element emits light incident through the diffusing element in the direction of the second illumination optical axis, and
the second condensing element is configured to be movable along an orthogonal plane with respect to one illumination optical axis of the first illumination optical axis and the second illumination optical axis, on which the second condensing element is located.

4. The light source device according to claim 1, wherein the wavelength conversion element is configured to be movable along one illumination optical axis of the first illumination optical axis and the second illumination optical axis, on which the wavelength conversion element is located.

5. A light source device comprising:
a light source section that emits excitation light;
a homogenizer optical element on which the excitation light is incident;
a light separation element that separates first excitation light and second excitation light from the excitation light incident through the homogenizer optical element;
a first condensing element that converges the first excitation light separated by the light separation element;
a wavelength conversion element on which the first excitation light converged by the first condensing element is incident and that emits fluorescent light; and
a second condensing element that converges the second excitation light separated by the light separation element, wherein
a diffusing element that diffusely reflects the second excitation light converged by the second condensing element,
the light source section, the homogenizer optical element, and the light separation element are disposed on a first illumination optical axis,
the first condensing element and the wavelength conversion element are disposed on one illumination optical axis of the first illumination optical axis and a second illumination optical axis intersecting the first illumination optical axis at the light separation element,
the second condensing element and the diffusing element are disposed on the other illumination optical axis of the first illumination optical axis and the second illumination optical axis,
the light separation element emits, in substantially the same direction, the fluorescent light incident from the wavelength conversion element through the first condensing element and the second excitation light diffusely reflected by the diffusing element through the second condensing element and incident on the light separation element,
the homogenizer optical element includes
a first multi-lens that includes a plurality of first lenses and divides the excitation light into a plurality of partial luminous fluxes with the plurality of first lenses, and
a second multi-lens that includes a plurality of second lenses corresponding to the plurality of first lenses and emits the plurality of partial luminous fluxes incident from the first multi-lens toward the light separation element,
the first multi-lens and the second multi-lens are configured to be movable along an orthogonal plane with respect to the first illumination optical axis,
the wavelength conversion element is configured to be movable along the one illumination optical axis of the first illumination optical axis and the second illumination optical axis, on which the wavelength conversion element is disposed,
the diffusing element is configured to be movable along the other illumination optical axis of the first illumination optical axis and the second illumination optical axis, on which the diffusing element is disposed, and the second condensing element is configured to be movable along an orthogonal plane with respect to the other illumination optical axis of the first illumination optical axis and the second illumination optical axis, on which the second condensing element is disposed.

6. An illumination device comprising:
the light source device according to claim 1; and
a homogenizing device that homogenizes an illuminance distribution in a region to be illuminated by light emitted from the light source device, wherein
the homogenizing device includes
a first lens array that includes a plurality of small lenses and divides a luminous flux incident from the light source device into a plurality of partial luminous fluxes,
a second lens array that includes a plurality of small lenses corresponding to the plurality of small lenses and on which the plurality of partial luminous fluxes are incident from the first lens array, and
a superimposing lens that superimposes the plurality of partial luminous fluxes through the second lens array onto the region to be illuminated.

7. A projector comprising:
the illumination device according to claim 6;
a light modulating device that modulates light emitted from the illumination device; and
a projection optical device that projects the light modulated by the light modulating device, wherein
the region to be illuminated is set on the light modulating device.

8. An illumination device comprising:
the light source device according to claim 2; and
a homogenizing device that homogenizes an illuminance distribution in a region to be illuminated by light emitted from the light source device, wherein
the homogenizing device includes
a first lens array that includes a plurality of small lenses and divides a luminous flux incident from the light source device into a plurality of partial luminous fluxes,
a second lens array that includes a plurality of small lenses corresponding to the plurality of small lenses and on which the plurality of partial luminous fluxes are incident from the first lens array, and
a superimposing lens that superimposes the plurality of partial luminous fluxes through the second lens array onto the region to be illuminated.

9. A projector comprising:
the illumination device according to claim 8;
a light modulating device that modulates light emitted from the illumination device; and
a projection optical device that projects the light modulated by the light modulating device, wherein
the region to be illuminated is set on the light modulating device.

10. An illumination device comprising:
the light source device according to claim 3; and
a homogenizing device that homogenizes an illuminance distribution in a region to be illuminated by light emitted from the light source device, wherein
the homogenizing device includes
a first lens array that includes a plurality of small lenses and divides a luminous flux incident from the light source device into a plurality of partial luminous fluxes,
a second lens array that includes a plurality of small lenses corresponding to the plurality of small lenses and on which the plurality of partial luminous fluxes are incident from the first lens array, and
a superimposing lens that superimposes the plurality of partial luminous fluxes through the second lens array onto the region to be illuminated.

11. A projector comprising:
the illumination device according to claim 10;
a light modulating device that modulates light emitted from the illumination device; and
a projection optical device that projects the light modulated by the light modulating device, wherein
the region to be illuminated is set on the light modulating device.

12. An illumination device comprising:
the light source device according to claim 4; and
a homogenizing device that homogenizes an illuminance distribution in a region to be illuminated by light emitted from the light source device, wherein
the homogenizing device includes
a first lens array that includes a plurality of small lenses and divides a luminous flux incident from the light source device into a plurality of partial luminous fluxes,
a second lens array that includes a plurality of small lenses corresponding to the plurality of small lenses and on which the plurality of partial luminous fluxes are incident from the first lens array, and
a superimposing lens that superimposes the plurality of partial luminous fluxes through the second lens array onto the region to be illuminated.

13. A projector comprising:
the illumination device according to claim 12;
a light modulating device that modulates light emitted from the illumination device; and
a projection optical device that projects the light modulated by the light modulating device, wherein
the region to be illuminated is set on the light modulating device.

14. An illumination device comprising:
the light source device according to claim 5; and
a homogenizing device that homogenizes an illuminance distribution in a region to be illuminated by light emitted from the light source device, wherein
the homogenizing device includes
a first lens array that includes a plurality of small lenses and divides a luminous flux incident from the light source device into a plurality of partial luminous fluxes,
a second lens array that includes a plurality of small lenses corresponding to the plurality of small lenses and on which the plurality of partial luminous fluxes are incident from the first lens array, and
a superimposing lens that superimposes the plurality of partial luminous fluxes through the second lens array onto the region to be illuminated.

15. A projector comprising:
the illumination device according to claim 14;
a light modulating device that modulates light emitted from the illumination device; and
a projection optical device that projects the light modulated by the light modulating device, wherein
the region to be illuminated is set on the light modulating device.

* * * * *